United States Patent
Chopra et al.

(10) Patent No.: US 11,075,949 B2
(45) Date of Patent: Jul. 27, 2021

(54) SYSTEMS AND METHODS FOR ALLOCATING SPI VALUES

(71) Applicant: Nicira, Inc., Palo Alto, CA (US)

(72) Inventors: Amit Chopra, Mountain View, CA (US); Chen Li, Sunnyvale, CA (US); Ganesan Chandrashekhar, Campbell, CA (US); Jinqiang Yang, Santa Clara, CA (US); Sanal Pillai, Sunnyvale, CA (US); Bin Qian, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 181 days.

(21) Appl. No.: 15/423,063

(22) Filed: Feb. 2, 2017

(65) Prior Publication Data

US 2018/0219915 A1 Aug. 2, 2018

(51) Int. Cl.
*H04L 29/06* (2006.01)
*H04L 9/08* (2006.01)
*H04L 9/16* (2006.01)
*H04L 9/12* (2006.01)

(52) U.S. Cl.
CPC ............ *H04L 63/20* (2013.01); *H04L 9/0838* (2013.01); *H04L 63/04* (2013.01); *H04L 63/0485* (2013.01); *H04L 63/061* (2013.01); *H04L 9/0866* (2013.01); *H04L 9/12* (2013.01); *H04L 9/16* (2013.01); *H04L 63/0435* (2013.01)

(58) Field of Classification Search
CPC ....... H04L 63/20; H04L 9/0838; H04L 63/04; H04L 63/0485; H04L 63/061; H04L 9/0866; H04L 9/12; H04L 9/16; H04L 63/0435
See application file for complete search history.

(56) References Cited

U.S. PATENT DOCUMENTS

| | | | |
|---|---|---|---|
| 6,327,660 B1 * | 12/2001 | Patel | G06F 21/575 380/277 |
| 7,234,058 B1 | 6/2007 | Baugher et al. | |
| 7,908,481 B1 * | 3/2011 | Donzis | H04L 29/12367 713/171 |
| 8,141,127 B1 * | 3/2012 | Mustafa | G06F 21/552 726/1 |
| 2003/0039361 A1 * | 2/2003 | Hawkes | G06F 21/10 380/278 |
| 2005/0213603 A1 * | 9/2005 | Karighattam | H04L 49/90 370/463 |

(Continued)

OTHER PUBLICATIONS

Annex to Form PCT/ISA/206 Communication Relating to the Results of the Partial International Search dated Apr. 4, 2018 for International Application No. PCT/US2018/016597, International Search Authority—European Patent Office, 14 pages.

*Primary Examiner* — Eleni A Shiferaw
*Assistant Examiner* — Bassam A Noaman
(74) *Attorney, Agent, or Firm* — Patterson + Sheridan, LLP

(57) ABSTRACT

Certain embodiments described herein are generally directed to allocating security parameter index ("SPI") values to a plurality of endpoints in a network. The SPI values may be derived using an SPI derivation formula and a plurality of parameters. In some embodiments, the SPI values may be derived by an endpoint and in other embodiments by a server. Using the SPI derivation formula and the plurality of parameters enables endpoints and servers to instantaneously derive SPI values without the need for servers to store them.

19 Claims, 12 Drawing Sheets

(56) References Cited

U.S. PATENT DOCUMENTS

| | | | |
|---|---|---|---|
| 2006/0005012 A1* | 1/2006 | Deshpande | H04L 63/10 |
| | | | 713/160 |
| 2007/0157309 A1 | 7/2007 | Bin et al. | |
| 2008/0059792 A1* | 3/2008 | Feder | H04L 63/0892 |
| | | | 713/155 |
| 2009/0043901 A1* | 2/2009 | Mizikovsky | H04L 63/06 |
| | | | 709/229 |
| 2009/0052379 A1* | 2/2009 | Suh | H04L 63/0869 |
| | | | 370/328 |
| 2011/0138458 A1* | 6/2011 | Kumar | H04L 63/18 |
| | | | 726/15 |
| 2015/0052348 A1* | 2/2015 | Moskowitz | H04L 63/0428 |
| | | | 713/151 |

* cited by examiner

Fig. 3

|     | EP0 | EP1 | EP2 | EP3 | EP4 |
|-----|-----|-----|-----|-----|-----|
| K0  | 1   | 2   | 3   | 4   | 5   |
| K1  | 6   | 7   | 8   | 9   | 10  |
| K2  | 11  | 12  | 13  | 14  | 15  |
| K3  | 16  | 17  | 18  | 19  | 20  |

|    | EP0 | EP1 | EP2 | EP3 | EP4 |
|----|-----|-----|-----|-----|-----|
| K0 | 1   | 2   | 18  | 4   | 5   |
| K1 | 6   | 7   | 3   | 9   | 10  |
| K2 | 11  | 12  | 8   | 14  | 15  |
| K3 | 16  | 17  | 13  | 19  | 20  |

Shift → 13

KP1 ↑ K0
KP2 ↑ K3

|  | EP0 | EP1 | EP2 | EP3 | EP4 |
|---|---|---|---|---|---|
| 0 | 1 | 2 | 3 | 4 | 5 |
| 1 | 6 | 7 | 8 | 9 | 10 |
| 2 | 11 | 12 | 13 | 14 | 15 |
| 3 | 16 | 17 | 18 | 19 | 20 |

SYSTEMS AND METHODS FOR ALLOCATING SPI VALUES

BACKGROUND

Software-defined networking ("SDN") may utilize distributed network encryption ("DNE"), which is a functionality created within the SDN framework to simplify key management associated with IP Security (IPSec). In some embodiments, DNE obviates the need for utilizing the Internet Key Exchange ("IKE") protocol in IPSec by allowing network controllers to distribute encryption keys as well as security parameter index ("SPI") values to various hosts within a logical network. DNE may distribute the same encryption keys and SPI values under each key policy. Typically, in order to keep track of the SPI values assigned to the hosts, network controllers and/or the hosts themselves store the values. Further, the assigned SPI values may be changed whenever a single host restarts, and new SPI values may be distributed to hosts and servers that support DNE.

SUMMARY

Herein described are one or more embodiments of a method for allocating SPI values to a plurality of endpoints ("EPs") in a network. The method includes deriving, independently at a first endpoint, an SPI value using an SPI derivation formula and one or more parameters. The method also includes establishing a secured communication channel between the first endpoint and a second endpoint using the SPI value. The method also includes communicating, by the first endpoint, with the second endpoint over the secured communication channel.

Also described herein are embodiments of a computer system, wherein software for the computer system is programmed to execute the method described above for allocating SPI values to a plurality of EPs in a network.

Also described herein are embodiments of a non-transitory computer readable medium comprising instructions to be executed in a computer system, wherein the instructions when executed in the computer system perform the method described above for allocating SPI values to a plurality of EPs in a network.

BRIEF DESCRIPTION OF THE DRAWINGS

FIG. 3 illustrates an example of a visual representation of globally unique SPI values corresponding to a plurality of EPs under multiple key policies.

FIG. 4 illustrates an example of a visual representation of a shift in the globally unique SPI values of FIG. 3 upon an EP restart.

FIG. 6 illustrates an example of a visual representation of locally unique SPI values corresponding to a plurality of source EPs for a certain key policy and destination EP.

DETAILED DESCRIPTION

Embodiments presented herein relate to allocating SPI values to a plurality of EPs in a network. For example, in some embodiments, SPI values are derived and allocated to a plurality of EPs based on multiple key policies, as further described below.

Figure 1:
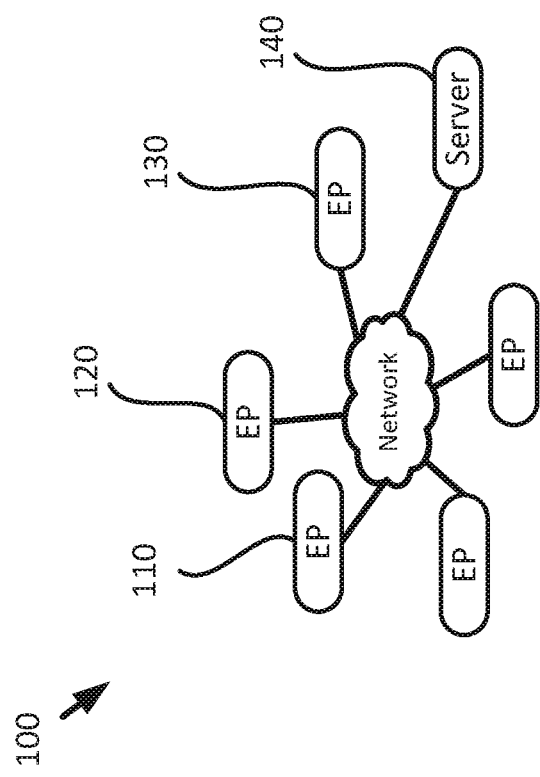
FIG. 1 illustrates an example of a network.

FIG. 1 illustrates an example of a network 100. Network 100 may represent a physical network. As shown by FIG. 1, network 100 may connect a plurality of EPs, including EP 110, EP 120, and EP 130. An EP may refer generally to an originating node ("source endpoint") or terminating node ("destination endpoint") of a flow of network packets, which can comprise one or more network packets being passed from the source to the destination endpoint. In practice, an endpoint may be a physical computing device (e.g., physical server, physical host). In certain embodiments, the endpoint may be configured to host one or more virtualized computing instances (e.g., virtual machine, container, data compute node, isolated user space instance) as further discussed herein. In some embodiments, all EPs within a network, e.g. network 100, may be managed by a server 140 (e.g., a central controller). In such embodiments, server 140 may control and manage communications and security between EPs, generate ID numbers for each EP, store data relating to each EP, etc. Server 140 may be a physical computing device (e.g., physical server, physical host), virtualized computing instance (e.g., virtual machine, container, data compute node, isolated user space instance) supported by a physical computing device, etc. In some aspects, server 140 may be a cluster of one or more physical computing devices or virtualized computing instances.

In a network, EPs may attempt to communicate with or transmit data packets to other EPs. For instance, EP 110 may attempt to transmit data packets to EP 120 in a secured fashion, such as by utilizing IP Security (IPSec) protocols. However, in some embodiments, before any data can be securely transferred using the IPSec framework, security associations may need to be established between the two EPs. In some embodiments, each security association is a one-way or simplex connection, and therefore at least two security associations, one for inbound and one for outbound, are established between two IPSec peers (e.g. EPs). These security associations may be a form of contract between the EPs detailing how to exchange and protect information among each other. In some embodiments, each security association is comprised of a mutually agreed-upon key, one or more security protocols, and/or an SPI value.

In some embodiments, the mutually agreed-upon key (e.g., session key or encryption/decryption key, interchangeably) may be generated by a server (e.g., server 140), based on the appropriate security rule and key policy, and subsequently distributed to the requesting EPs. In other embodiments, the key may be generated by one or more of the EPs prior to their data transfer. In addition to a mutually agreed-upon key, in some embodiments, each security association may also designate a mutually agreed-upon security protocol to provide security. These IPSec security protocols may include Authentication Header (AH), Encapsulating Security Payload (ESP), etc. After security associations have been established between two IPSec peers, one or more of these security protocols may be used to protect data packets for transmission.

In addition to a mutually agreed-upon key and security protocol, a security association may include an SPI value. In some embodiments, each SPI value is a binary string of numbers attached to a security association, which enables an EP to distinguish among multiple active security associations. As an example, SPI values may be used to distinguish between the inbound and outbound security associations running on an EP. In some cases, the Internet Key Exchange (IKE) protocol is used to generate these SPI values as well as encryption/decryption keys in the IPSec framework. For example, prior to any data exchange, IKE performs a two-phase negotiation session, which results in establishing two security associations between two IPSec peers. These security associations may not only contain mutually agreed-upon encryption and decryption keys to be used for incoming and outgoing traffic, but they also maintain sequence numbers for each data transfer.

For instance, when a sender of information (source EP) sends a message, it adds a sequence number to its data packet. The sequence number starts at 0 and is incremented by 1 for each subsequent packet. Each time a data packet is sent by a sender of information, the receiver verifies that the sequence number is not that of a previously sent packet. These sequence numbers are maintained to ensure anti-replay. However, if the IKE protocol is used to establish these security associations in a network with, for instance (N) number of hosts, then each host may need to set up (N−1) IKE negotiation sessions.

Accordingly, in some embodiments, instead of using IKE, DNE is utilized to simplify key management and SPI allocation. DNE enables a central unit, e.g. a server, such as server 140, to generate and distribute encryption/decryption keys and SPI values to EPs in a network. DNE also simplifies protecting network traffic of EPs (e.g., virtual machines running on EPs) by allowing users (e.g. network administrators) to define simple security rules and key policies. For example, in some embodiments, server 140 may store, in its memory, a plurality of security rules and key policies. Security rules may be user-defined rules that users input into server 140 through an interface (e.g., via a manager, which may be a physical computing device or a virtualized computing instance supported by a physical computing device). Security rules may define what key policy may be used by server 140 to generate an encryption/decryption key for data transfer between EPs in a network. As an example, server 140 may store key policies 1, 2, 3, etc. A user-defined security rule may then dictate that key policy 1 must be used for traffic going from EP 110 to EP 120.

In some embodiments, each key policy may be associated with one or more EPs and include certain specifications that define properties of an encryption/decryption key. In some embodiments, a specification may be an algorithm, action, and/or strength of the key. In the example above, a session key may be generated, based on key policy 1, for use in encrypting or decrypting data packets between EP 110 and EP 120.

In some embodiments, server 140 may be configured by DNE to distribute the same encryption/decryption key and SPI value to EPs under each key policy. However, in some other embodiments, server 140 may be configured to distribute unique SPI and key values to EPs. In some embodiments, unique SPI values may provide anti-replay protection and avoid network disruption and data loss in a large network implementing the DNE functionality. To illustrate this using an example, let's assume EPs 110, 120, and 130 have been assigned unique SPI values and are communicating. In such an example, an attacker or hacker is not able to capture traffic originating from EP 110 to EP 120 and replay as originating from EP 110 to EP 130. In addition to providing anti-replay protection, allocating unique SPI values may also prevent network disruption and data loss. In the example above, unique SPI values may prevent traffic from EP 130 to EP 120 being dropped due to mismatching sequence numbers at EPs. Mismatching takes place when, for example, the sequence number that EP 120 is on may be incremented due to its communication with EP 110, whereas EP 130 is starting to mark data packets with sequence numbers starting from 0. In addition to preventing network disruption, assigning unique SPI values prevents data loss because, if one of the hosts restarts, the sequence numbers maintained by other hosts do not need to be reset.

Figure 2:
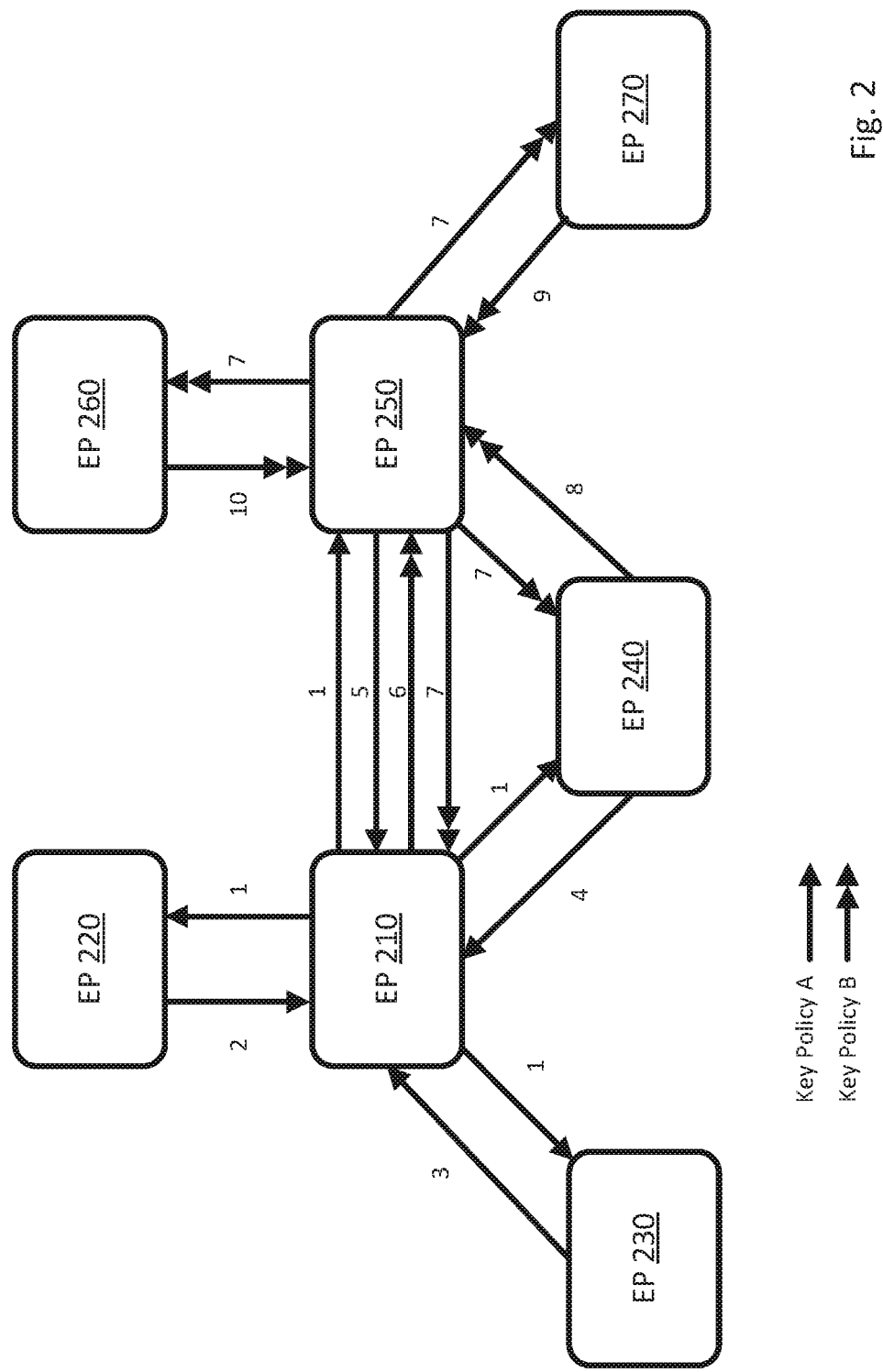
FIG. 2 illustrates an example of assigning globally unique SPI values to EPs within a network based on multiple key policies.
Figure 3:
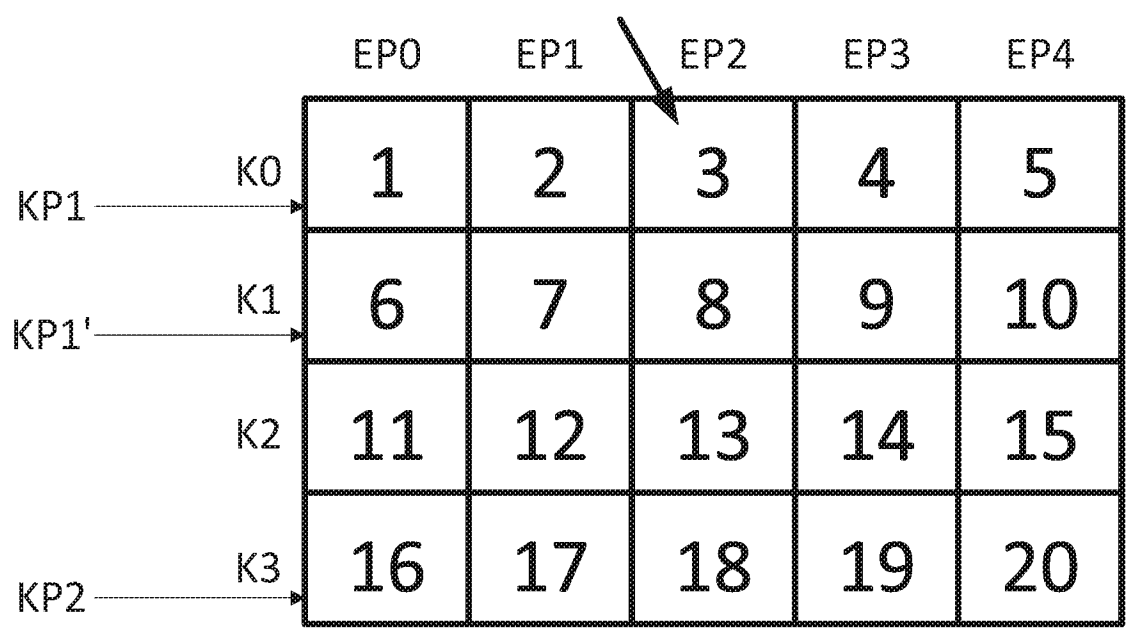
Figure 5:
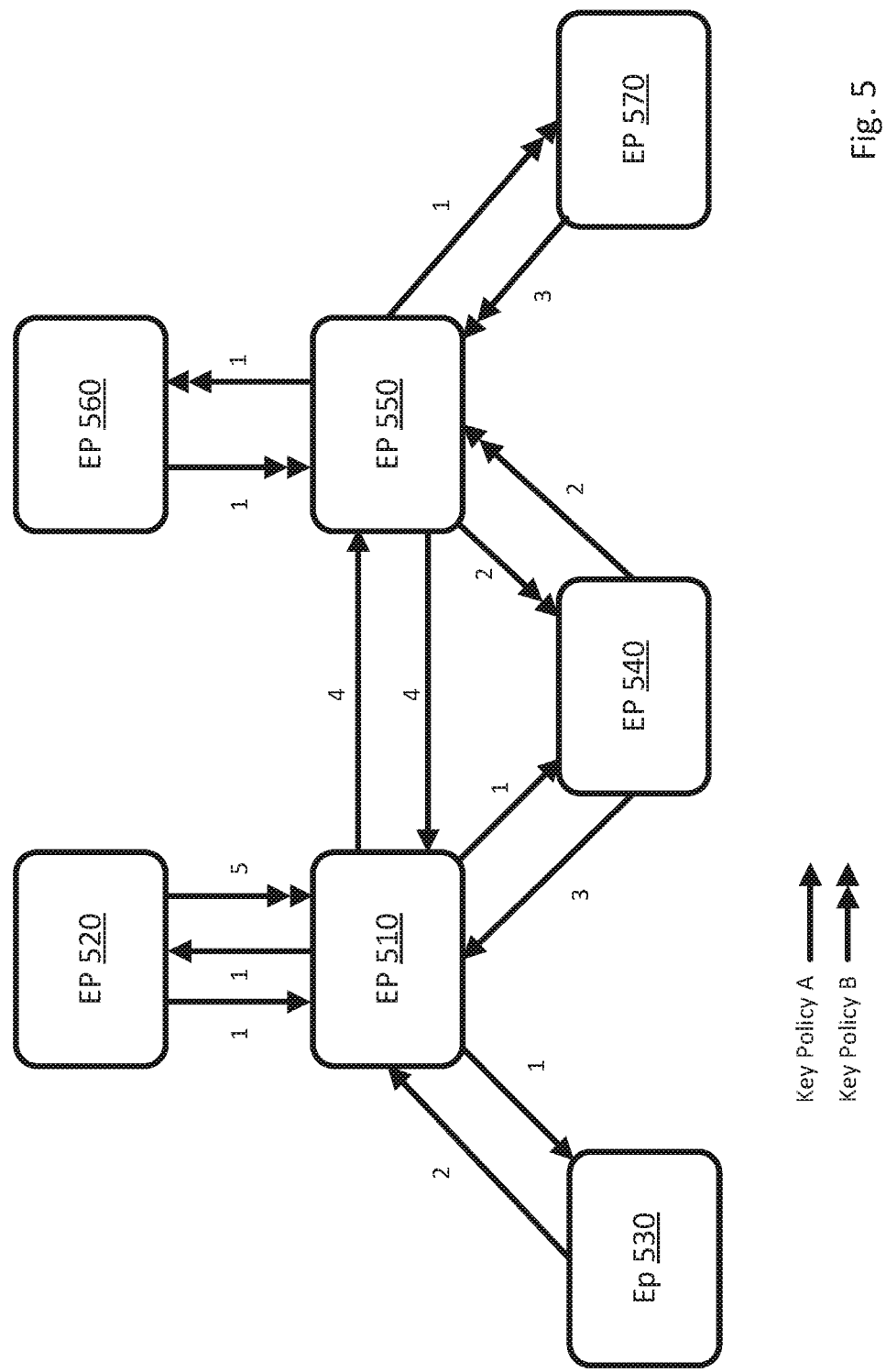
FIG. 5 illustrates an example of assigning locally unique SPI values to EPs within a network based on multiple key policies.

Furthermore, in some embodiments, the SPI values may be globally unique and, in other embodiments, the SPI values may be locally unique. The embodiments described with reference to FIGS. 2, 3, and 4, provide processes for assigning each sender of information (e.g., source EP) a globally unique outbound SPI value. Some other embodiments, described by reference to FIGS. 5 and 6, provide processes for allocating locally unique SPI values to be used by one or more source EPs in communication with a certain destination EP.

FIG. 2 illustrates an example of assigning globally unique SPI values to EPs within a network based on multiple key policies. As shown in FIG. 2, a plurality of EPs, including EPs 210, 220, 230, 240, 250, 260, and 270 may be part of a network.

As described above in relation to FIG. 1, assigning globally unique outbound SPI values to EPs within a network may provide anti-replay protection and avoid network disruption and data loss. Under the global SPI allocation described herein, in some embodiments, all SPI values associated with an EP may be unique across all key policies (e.g., each EP within a network may be guarded by multiple key policies). In addition, in some embodiments, SPI values associated with a key policy may be unique across all EPs (e.g., a key policy may spread to multiple EPs). Further, SPI values under the same key policy may be regenerated upon any CRUD (create, retrieve, update, and delete) events relating to the key policy (further described in FIG. 3). Also, when an EP restarts, all SPI values corresponding to the EP may be regenerated even if they belong to different key policies (further described in FIG. 4).

As illustrated in FIG. 2, each EP has been allocated a globally unique SPI value for its outbound security associations. For instance, under key policy A (illustrated by a single arrow), EP 210 has been assigned SPI value 1 that EP 210 is using for its outbound security associations with EPs 220, 230, 240, and 250. In addition, each of EPs 220, 230, 240, and 250 has been assigned globally unique outbound SPI values 2, 3, 4, and 5, respectively. Under another key policy, key policy B (illustrated by double arrows), EP 210 has been assigned a different outbound SPI value, 6. Similarly, EP 250 has been assigned a globally unique value, 7, for its outbound security associations with EPs 210, 240, 260 and 270, each of which also has their own globally unique outbound SPI value. In addition to a globally unique SPI value, each security association may include a unique encryption/decryption key. In the DNE framework, these keys are used by a source EP to encrypt traffic and by a destination EP to decrypt traffic. In some embodiments, this key may be generated by each EP. In other embodiments, a server (e.g., server 140) may generate the key. In some embodiments, the key may be generated using a function and one or more parameters. The following is an example of a function that may be used, in some embodiments, for key generation:

Session Key=$fn$(MASTER_KEYkp,SPIsrc,SPI dst, RND_NUMsrc,RND_NUMdst)

In the Session Key function above, MASTER_KEYkp represents a common key associated with a key policy. This key may change when the corresponding key policy is updated. SPIsrc represents an SPI value assigned to source EP (sender of information) for a given key policy. This SPI value may change when the corresponding key policy is updated. SPIdst represents SPI assigned to a destination EP (receiver of information) for a given policy. This SPI value may change when the corresponding key policy is updated. RND_NUMsrc represents a random number associated with a source EP. This number may change when the source EP restarts. RND_NUMdst represents a random number associated with a destination EP. This number may change when the destination EP restarts.

As described in relation to FIG. 1, using the global SPI allocation and the key management described above provides anti-replay protection and prevents network disruption and data loss. In order to allocate globally unique SPI values across a network, a server (e.g., server 140) may need to keep track of the SPI values assigned to the EPs. For instance, if EP 210 has been assigned SPI value 1, the server that manages EP 210 may keep track of that assignment to avoid allocating the same SPI value to other EPs in the network. As such, in some embodiments, SPI values may be stored by servers. However, certain embodiments described herein relate to global SPI allocation and derivation techniques that do not require storing the SPI values. For example, in some embodiments, each EP and/or server within a network may derive globally unique SPI values on-demand by using SPI Derivation Data ("SDD"), which may be stored by each EP and/or server within the network. Deriving globally unique SPI values on-demand using SDD prevents scalability issues that may result from storing a very large number of unique SPI values for, e.g. thousands of EPs in a network. In addition, as each EP and/or server within a network is able to derive SPI values, there is not a need for synchronization or updates between EPs and servers in the event of, for example, an EP restart. In embodiments where the EPs derive their own SPI values, the server may save significant computing resources and avoid creating a bottleneck by delegating the derivation of the SPI values to EPs. This approach also leads to great performance gain. This is because not every EP needs to communicate with other EPs and, therefore, has no need for an SPI value until communication is necessary. Therefore, computing power is used to derive an SPI value only when there is a need.

As described above, in some embodiments SDD may be used, by an EP and/or a server to derive globally unique SPI values. In certain embodiments, SDD may comprise an EP ID number, a key policy number, a global SPI derivation formula ("GSDF"), shift factor, $K_{max}$, and $EP_{max}$. In certain embodiments, a server (e.g., manager, server 140, etc.) may generate and assign an EP ID number to an EP that is added to the network. The server may keep track of these EP ID numbers by storing, in its memory, information relating to EPs and their corresponding ID numbers. Also, as described above, each key policy may be assigned to a group of EPs and may include certain specifications that define properties of an encryption/decryption key. The server may also keep track of this by storing in memory, information relating to EPs and their assigned key policies. As discussed, SDD may also include a GSDF. GSDF may be a function (e.g., a linear function) that uses one or more parameters, including the EP ID number, the key policy number, the shift factor, $K_{max}$ (described below), and $EP_{max}$ (described below), to derive globally unique SPI values.

In some embodiments, SDD, including GSDF and one or more parameters, may be stored by each EP and/or a server. Accordingly, each EP and/or server can derive SPI values based on the stored GSDF and one or more parameters, without the need for the server to store the SPI values (e.g., SPI values for a plurality of EPs).

The following is an example of a formula (GSDF) that may be used, in some embodiments, for deriving globally unique SPI values:

$$SPI(K_i,EP_j,S_j)=EP_{max}*[(K_i-S_j+K_{max})\% \; K_{max}]+EP_j+1$$

In the formula above, SPI represents a binary SPI value (e.g., with a limited size). In some embodiments, each SPI value may be 32 bits long. $EP_{max}$ is the maximum number of EPs that a network, using the DNE functionality, can support. However, this does not mean that the total number of actual EPs in the network is equal to $EP_{max}$. $EP_{max}$ is merely a constant (e.g., that is defined when the server 140 boots). $K_{max}$ is two times the maximum number of key policies ($K_{max}/2$) that DNE supports. However, again this does not mean that the total number of actual key policies is equal to $K_{max}/2$ in all networks. $K_{max}$ is merely a constant (e.g., that is defined when the server 140 boots). In some embodiments, $K_{max}$ and $EP_{max}$ may be user-defined. Also, in certain embodiments, $K_{max}*EP_{max}$ may be, at most, a 32-bit binary number.

$EP_j$ corresponds to the source EP ID number, and may be illustrated by a column index as later described with respect to FIG. 3. In some embodiments, $EP_j$ is, at most, a 17-bit ($2^{17}$) number and does not change during the network's lifecycle. Also, as described above, EP, does not exceed $EP_{max}$. $K_i$ corresponds to the key policy number, which, in some embodiments, is generated and maintained by the server. $K_i$ may be illustrated by a row index as later described with respect to FIG. 3. In some embodiments, $K_i$ is, at most, a 15-bit ($2^{15}$) number and may change due to a change to the corresponding key policy. In some embodiments, the server may keep track of these EP ID numbers and key policy numbers by storing in memory, information relating to EPs, their EP ID numbers, and their corresponding key policy numbers.

$S_j$ is the shift factor, which changes upon an EP restart (shown in FIG. 4). In some embodiments, $S_j$ may only increment by one after an EP restart for ease of implementation ($S_j=S_j+1$). In some other embodiments, $S_j$ may only shift within a range to make debugging easier ($S_j=[S_j+1]$ &0x03). In yet other embodiments, $S_j$ may be a random number ($S_j$=random.nextIntl( )). In certain embodiments, $S_j$ is less than $K_{max}$. In some embodiments, the server keeps track of these shift factors by storing in memory, information relating to EPs and their corresponding shift factors. The shift factor ($S_j$) varies depending on whether or not the corresponding EP has been restarted or not or how many times it has been restarted. $K_{max}$ and $EP_{max}$, as described above, are also user-defined or pre-defined values that may also be stored by the server. In addition to the parameters above, in certain embodiments, mod operations are used in GSDF to ensure safe wraparound. In certain embodiments, if the parameters above are unsigned integers, the resulting SPI value automatically wraps around without using mod operations.

FIG. 3 illustrates an example of a visual representation of globally unique SPI values corresponding to a plurality of EPs under multiple key policies, according to certain embodiments. FIG. 3 shows a table that corresponds to a network supporting up to five EPs and up to two key policies. Each column corresponds to an EP ID number and each row corresponds to a key policy. As illustrated by FIG. 3, two key policies, KP1 and KP2, have been created. In some embodiments, when a key policy is created, the server assigns the key policy a $K_i$ number corresponding to a row on the table. For instance, when KP1 is created, the server may assign row 0 ($K_0$) to KP1. Therefore, as an example, if EP2 is attempting to communicate with another EP in the network, and the key policy designated by the users for such communication is KP1, EP2 then derives a 32-bit SPI value, whose visual representation on the table shown is cell 3, which is the intersection of row 0 corresponding to KP1 and column 2 corresponding to EP2.

In some embodiments, a key policy assigned to a group of EPs may be changed or updated, for example, as a result of a CRUD (create, read, update, or delete) event. In such embodiments, all SPI values under the same key policy may be re-derived. For instance, if KP1 is updated to KP1', then the server may assign row 1 to KP1'. In this instance, EP2 then re-derives an SPI value, whose visual representation on the table shown is 8. If KP1' is updated again to KP1", then the server may assign row 0 to KP1" so that the SPI values are again updated. Accordingly, there are two rows for each key policy to enable updated SPI values in case the key policy is updated. In addition to a change in the globally unique SPI values upon a key policy CRUD event, when an EP restarts, all globally unique SPI values under the EP may need to be regenerated even if they belong to different key policies.

FIG. 4 illustrates an example of a visual representation of a shift in the globally unique SPI values of FIG. 3 upon an EP restart, according to certain embodiments. In some embodiments, if an EP reboots or restarts, new globally unique SPI values are allocated to the EP for its outbound traffic. In certain embodiments, this is performed by a shift in the globally unique SPI values assigned to the EP under various key policies. As described above, the shift is denoted by a shift factor $S_j$, which may, in some embodiments, only be incremented by one. For example, as shown in FIG. 4, after EP2 restarts, the globally unique SPI values assigned to it shift downwards by one. This allocates new globally unique SPI values to EP2 again, under each key policy. In some embodiments, when an EP restarts, the server generates a shift factor and then pushes the shift factor to all the EPs or at least the affected ones. In some embodiments, the server then stores the shift factor associated with each EP, by storing it in memory, for later use (e.g. to send to any existing or new EPs added to the network, as needed). As described previously, the tables illustrated in FIGS. 3 and 4 are merely visual representations of how SPI values are derived for EPs under multiple key policies. In other words, the cell numbers illustrated on the tables visually represent a 32-bit number that is not shown and can be derived by the GSDF.

Moving now to the allocation of locally unique SPI values, FIG. 5 illustrates an example of assigning locally unique SPI values to EPs within a network based on multiple key policies. The locally unique SPI values may be used by one or more source EPs in communication with a destination EP. Under the local allocation of unique SPI values, in some embodiments, all SPI values associated with a destination EP may be unique across all key policies (e.g., each EP within a network may be guarded by multiple key policies). Further, SPI values under the same key policy may be regenerated upon any CRUD events relating to the key policy (further described in FIG. 6). Also, when an EP restarts, all SPI values under the EP may be regenerated even if they belong to different key policies (further described with respect to FIG. 6).

Similar to FIG. 2, in some embodiments, EPs 510, 520, 530, 540, 550, 560, and 570 may be part of a network. As shown in FIG. 5, a locally unique SPI value may be allocated, under a certain key policy, for communication with EP 510, as a destination EP. As an example, EP 520 may attempt to communicate with EP 510, in which case EP 520 is the source EP and EP 510 is the destination EP. In such an example, a locally unique SPI value, 1, may be derived for an outbound security association originating from EP 520. In other examples, as shown in FIG. 5, where EPs 530, 540, or 550 are the source EPs, with the destination EP remaining as EP 510, the locally unique SPI values may be 2, 3, or 4, respectively.

In some embodiments, the term locally unique may mean that, for a certain destination EP (e.g. destination EP 510), the inbound SPI values used by other EPs (e.g. source EPs 520-550) may be unique only for that certain destination EP under a given key policy (e.g. SPI values, 1, 2, 3, and 4, under key policy A). Accordingly, as shown in FIG. 5, if EP 520 attempts to communicate with EP 510 under key policy B now, instead of the previously used key policy A, a new and different SPI value (e.g. SPI value 5) may be used by EP 520. However, if the destination EP changes to another EP, the same inbound SPI values may be used again. This means that, in some embodiments, an SPI value can be used by two EPs both as an inbound and an outbound SPI (e.g., SPI value 1 is used as both inbound and outbound SPI between EPs 510 and 520). In addition, in some embodiments, a source EP can use the same SPI value in communication with multiple other EPs (e.g., EP 510 using outbound SPI value 1 to communicate with EP 520, 530, and 540). For instance, as shown in FIG. 5, if EP 550 is the destination EP and the source EPs are EPs 560, 540, 570 and 510, the locally unique SPI values derived for communication with EP 550 may also be 1, 2, 3, and 4, respectively.

As described above in relation to FIG. 2, in addition to an SPI value, each security association may include a unique encryption/decryption key. In some embodiments, a key may be derived using a function, such as the Session Key function used under the global SPI allocation described with reference to FIG. 2.

Similar to the global SPI allocation, the local SPI allocation and key management described above also provide anti-replay protection and prevent network disruptions and data loss within the DNE framework. In addition, similar to the global SPI derivation techniques described in relation to FIGS. 2-4, deriving locally unique SPI values on-demand also prevents scalability issues and obviates the need for synchronization and updating between EPs and servers. Accordingly, certain embodiments described herein relate to local SPI allocation and derivation techniques that do not require storing the SPI values by the server. For example, in some embodiments, each EP and/or server within a network may derive locally unique SPI values on-demand by using data such as SDD, which may be stored by each EP and/or sever within the network.

In some embodiments, SDD may include data for the local allocation of SPI values. In such embodiments, the data may include a formula and one or more parameters. The following is an example of a formula (e.g. local SPI derivation formula ("LSDF")), that may be used, in some embodiments, for deriving locally unique SPI values:

$$SPI(K_i, EP_{src}, EP_{dst}) = EP_{max} * Row(K_i, EP_{dst}) + EP_{src}$$

In the formula above, SPI represents a binary SPI value (e.g., with a limited size). In some embodiments, each SPI value may be 32 bits long. $EP_{max}$ is the maximum number of EPs that a distributed network, using the DNE functionality, can support. However, this does not mean that the total number of actual EPs in all networks is equal to $EP_{max}$. $EP_{max}$ is merely a constant (e.g., that is defined when the server boots). In some embodiments, $EP_{max}$ is, at most, a 17-bit ($2^{17}$) number and does not change during the network's lifecycle. $EP_{src}$ corresponds to the EP ID number of a source EP, and may be illustrated by a column index as later described with respect to FIG. 6. Also, $EP_{src}$ may not change during the network's lifecycle and also does not exceed $EP_{max}$. $EP_{dst}$ corresponds to the EP ID number of a destination EP. Similar to $EP_{src}$, in some embodiments, $EP_{dst}$ is, at most, a 17-bit ($2^{17}$) number and may change in the event of an EP restart. $EP_{dst}$ also does not exceed $EP_{max}$. $K_i$ corresponds to the key policy number, which, in some embodiments, is generated and maintained by the server. In some embodiments, $K_i$ may change due to a change to the corresponding key policy.

$Row(K_i, EP_{dst})$ corresponds to a row number, as later described with respect to FIG. 6. In some embodiments, $Row(K_i, EP_{dst})$ can be derived by a mapping function. As an example, the mapping function may be $Row(K_i, EP_{dst})=k+e$. In such an example, k may be a value corresponding to a certain key policy ($K_i$) while e may be a value corresponding to a certain destination EP ($EP_{dst}$). In some embodiments, k is generated and maintained by the server. Furthermore, in some embodiments, the server changes k each time the corresponding key policy has a CRUD operation or if a rekey takes place. For instance, for key policy 1, k may be zero when key policy 1 is created (e.g. prior to any CRUD events) but be changed to 1, when the key policy is updated. In some embodiments, e is generated and maintained by the server. In addition, in some embodiments, the server changes e each time the corresponding EP has a restart. For example, when an EP is first added to the network, the server may generate e and assign value zero to it. However, after the EP restarts, in some embodiments, the server may increment e by 1 (e.g. e=e++).

Generating and reclaiming unique k and e values may be accomplished by using various designs and optimizations. For example, in some embodiments, e may only be assigned numbers from 0 to 5, so that more numbers may remain to be assigned to k. Also, in some embodiments, e and k values may be changed and maintained by the server or an identity allocation system (IDAS) that returns unique e and k values. Using the e and the k values, in some embodiments, row number (e.g. $Row(K_i, EP_{dst})$) may be calculated by the server and, in some embodiments, by each EP. In the embodiments where the server calculates the row number, an EP may send a request to the server for the row number. In the embodiments where the EP calculates the row number, EP may use the e and k values received from the server to perform the calculation. In some embodiments, there is always a row to be assigned for any given destination EP under any key policy. $Row_{max}$ is the maximum number of rows that a distributed network, using the DNE functionality, can support in certain embodiments. In some embodiments, $Row_{max}$ can be a 15-bit ($2^{15}$) number. Accordingly, in some embodiments, $Row_{max} * EP_{max}$ may be, at most, a 32-bit binary number.

FIG. 6 illustrates an example of a visual representation of locally unique SPI values corresponding to a plurality of source EPs for a certain key policy and destination EP, according to certain embodiments. FIG. 6 shows a table that corresponds to a network supporting up to five EPs. Let's also assume that two key policies have been created, KP1 and KP2 (not shown). Each column corresponds to a source EP while each row corresponds to a row number calculated by a mapping function, such as $Row(K_i, EP_{dst})$, described above. Prior to any CRUD events or any rekey, in some embodiments, k for KP1 may be 0 (k1=0) and k for KP2 may be 1 (k2=1). Also, prior to any EP restarts, in some embodiments, e for all EPs may be zero (e0=e1=e2=e3=e4=0). Accordingly, in some embodiments, $Row(K_1, EP_0)$=k1+e0=0 and $Row(K_2, EP_0)$=k2+e0=1. As an example, when EP0 is the destination and KP1 is the key policy, $Row(K_1, EP_0)$=0, the SPI values may then be SPI (K1, EP0, EP0)=1, SPI (K1, EP1, EP0)=2, SPI (K1, EP2, EP0)=3, SPI (K1, EP3, EP0)=4, SPI (K1, EP4, EP0)=5. If key policy 2 is chosen, $Row(K_2, EP_0)$=1, the SPI values may then be SPI (K2, EP0, EP0)=6, SPI (K2, EP1, EP0)=7, SPI (K2, EP2, EP0)=8, etc. In some embodiments, as described above, if an EP restarts, the e value corresponding to the EP changes based on a formula. As an example, if EP0 restarts, e0 may increment by 1 (e0=0+1). In such an example e0=1, k1=0, and k2=1. Therefore, $Row(K_1, EP_0)$=1, and $Row(K_2, EP_0)$=2. Accordingly, in the example above, SPI (K1, EP0, EP0)=6, SPI (K1, EP1, EP0)=7, SPI (K1, EP2, EP0)=8, etc.

In some embodiments, as described above, a key policy may be updated due to a CRUD event or a rekey. For example, KP2 may do an auto-rotation, which may result in KP2 receiving a new k value. In the example above, the next available k value may be 3, in which case k2 will be assigned number 3. Accordingly, continuing with the example above, $Row(K_2, EP_0)$=3+1=4 and $Row(K_2, EP_1)$=3+0=3.

Figure 7:
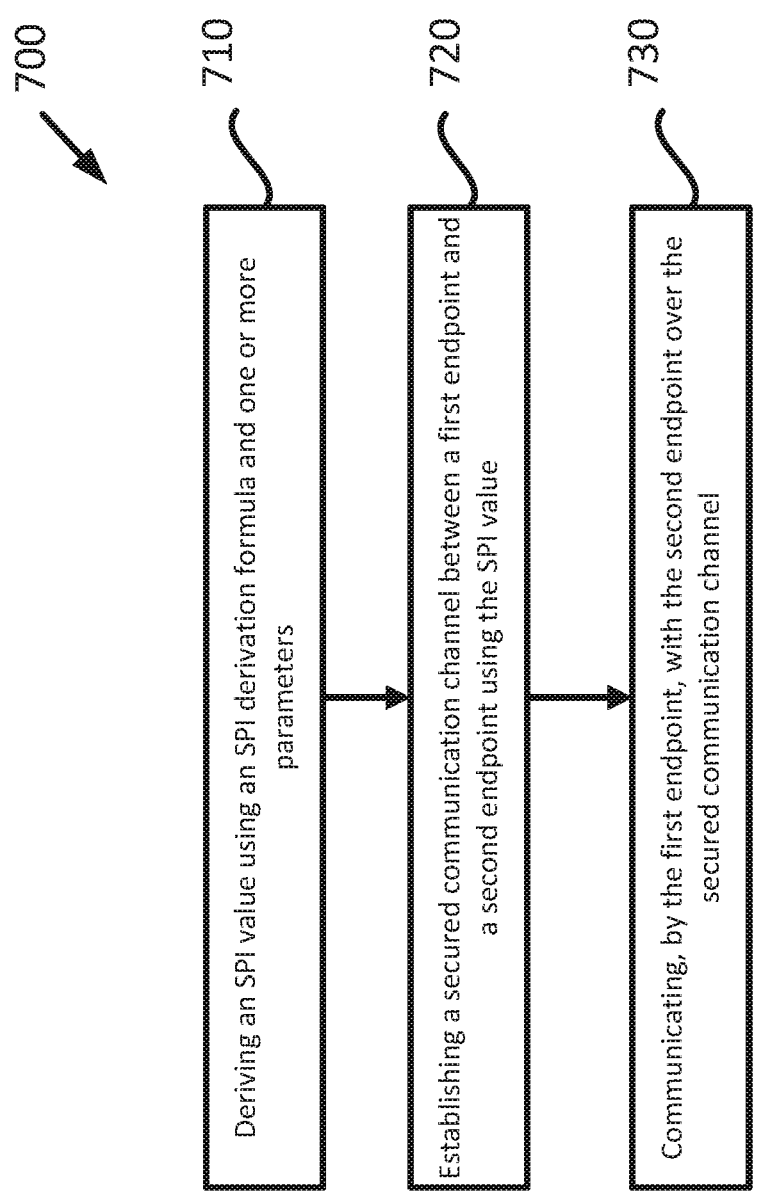
FIG. 7 illustrates example operations for deriving an SPI value, according to some embodiments.

FIG. 7 illustrates example operations 700 for deriving an SPI value, according to certain embodiments. With respect to the method outlined in FIG. 7, it is noted that certain details and features have been left out of example operations 700 in order not to obscure the discussion of the inventive features in the present invention.

Example operations 700 begin, at 710, with deriving an SPI value using an SPI derivation formula and one or more parameters. In some embodiments, where a globally unique SPI value is being derived, the formula may be the GSDF and the one or more parameters may include an EP ID number, a key policy number, a shift factor, a maximum EP ID number ($EP_{max}$), and a maximum key policy number ($K_{max}$). In some other embodiments, where a locally unique SPI value is being derived, the formula may be the LSDF and the one or more parameters may include a key policy number, a source EP ID number, a destination EP ID number, a row number ($Row(K_i, EP_{cis})$), and $EP_{max}$.

At 720, example operations 700 continue with establishing a secured (e.g., encrypted) communication channel between a first EP (e.g. EP 110) and a second EP (e.g. EP 120) using the SPI value. Establishing a secured communication channel may result from setting up security associations between the first and the second EPs, as described below in step 850 of FIG. 8.

At 730, example operations 700 continue with communicating, by the first EP, with the second EP over the secured communication channel. As described below in step 850 of FIG. 8, the secured communication channel may be used by the first and the second EPs to transfer encrypted data packets to each other.

Figure 8:
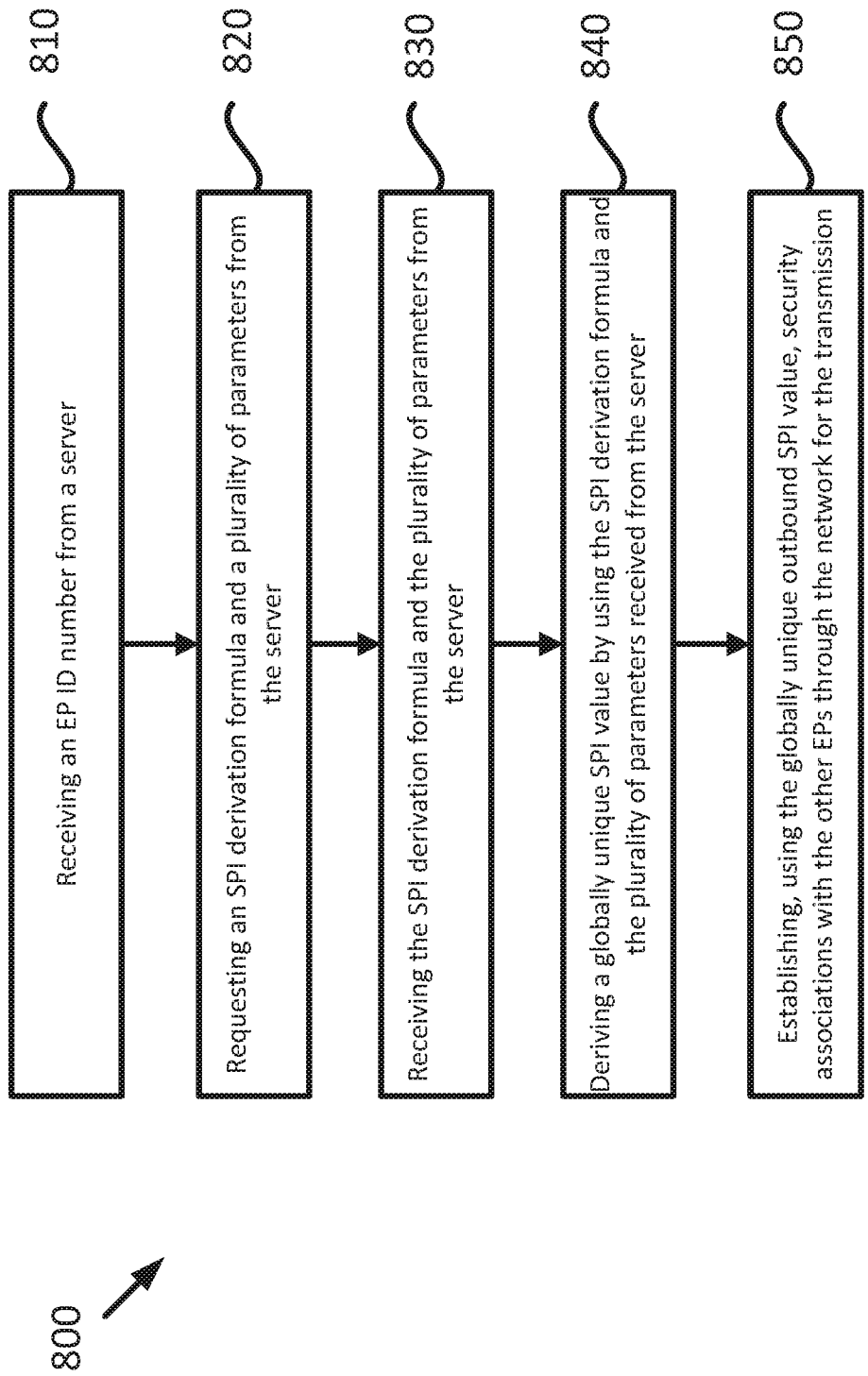
FIG. 8 illustrates example operations for deriving a globally unique SPI value using an EP.
Figure 9:
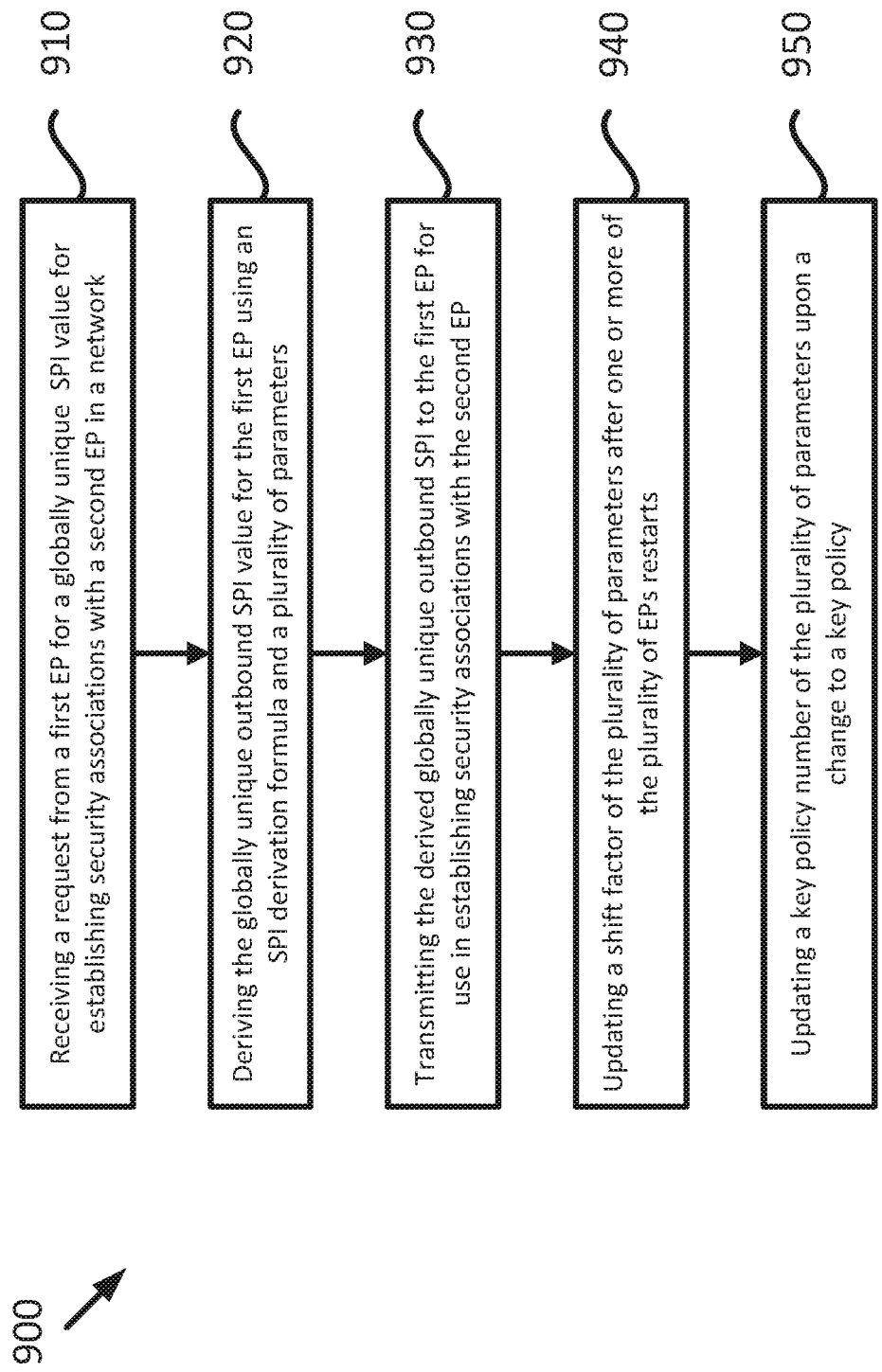
FIG. 9 illustrates example operations for deriving a globally unique SPI value using a server.
Figure 10:
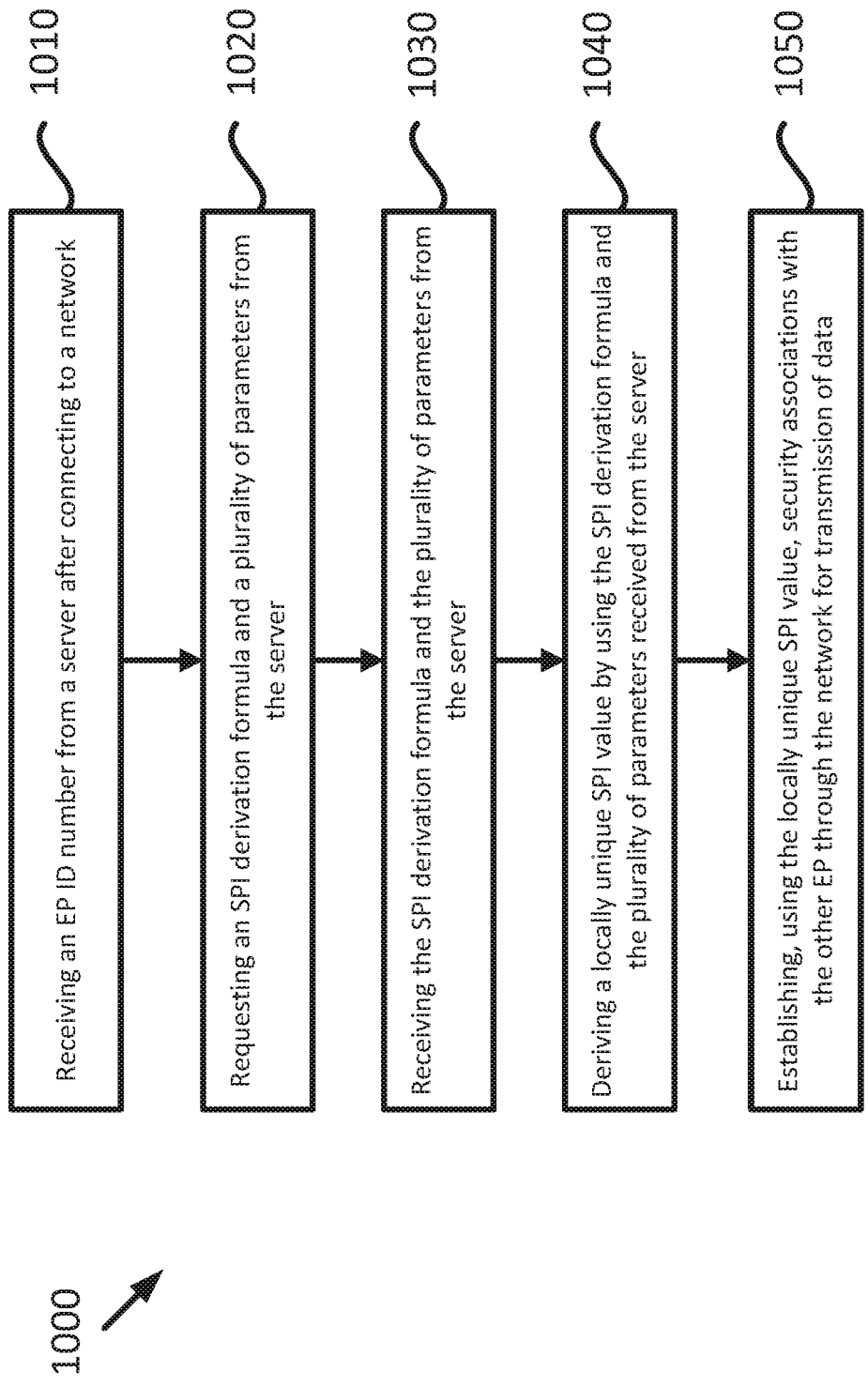
FIG. 10 illustrates example operations for deriving a locally unique SPI value using an EP.
Figure 11:
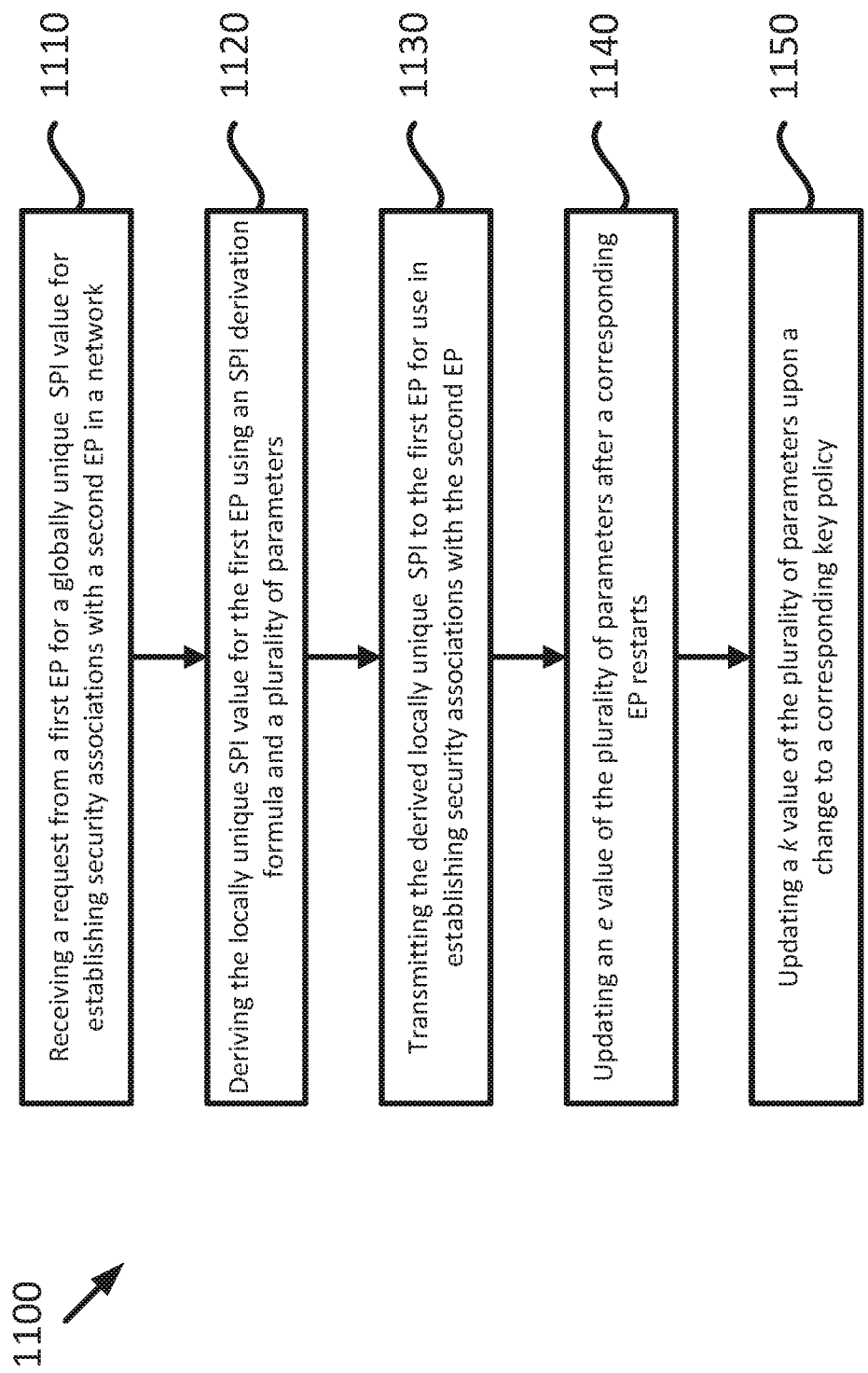
FIG. 11 illustrates example operations for deriving a locally unique SPI value using a server.

As described above in relation to FIG. 1, in some embodiments, an EP may perform the derivation of its own outbound SPI value. As a result, in such embodiments, the EP performs the method described by steps 710 through 730 of FIG. 7. Steps 810 through 840 of FIG. 8, illustrate an example of the steps the EP may perform to derive a globally unique SPI value. On the other hand, steps 1010 through 1040 of FIG. 10 illustrate an example of the steps the EP may perform to derive a locally unique SPI value. In other embodiments, the server (e.g., server 140) may perform the derivation of an SPI value, corresponding to step 710 of example operation 700. Steps 910 through 920 of FIG. 9, illustrate an example of the steps the server may perform to derive a globally unique SPI value. On the other hand, steps 1110 through 1120 of FIG. 11, illustrate an example of the steps the server may perform to derive a locally unique SPI value.

FIG. 8 illustrates example operations 800 for deriving a globally unique SPI value using an EP, according to certain embodiments. With respect to the method outlined in FIG. 8, it is noted that certain details and features have been left out of example operations 800 in order not to obscure the discussion of the inventive features in the present invention. Example operations 800 will be described below by reference to EP 110, as an example. However, any other EP in network 100 of FIG. 1 may also perform example operations 800.

As shown, at 810, EP 110 starts by receiving an EP ID number from server 140 after connecting to network 100. As described in relation to FIG. 2, in some embodiments, the EP ID number may be generated by server 140 and then transmitted to EP 110. In some embodiments, server 140 may automatically generate the EP ID number and send it to EP 110 after EP 110 is added to network 100. In some other embodiments, after being added to network 100, EP 110 may send a request to server 140 for an EP ID number. In such embodiments, server 140 then generates the EP ID number and sends it to EP 110. In yet other embodiments, other components in network 100 may generate the EP ID number.

At 820, EP 110 continues by optionally requesting an SPI derivation formula and one or more parameters from server 140. As described in relation to FIG. 1, in some embodiments, prior to any IPSec secured transmission of data packets, security associations may be established between two EPs, each of which may need its own globally unique outbound SPI value. Accordingly, in some embodiments, to communicate with EP 120, EP 110 may derive its own globally unique outbound SPI value. To derive a globally unique outbound SPI value, EP 110 may use data (e.g. SDD) including one or more parameters and a formula (e.g. GSDF). As described above, in some embodiments, GSDF and the one or more parameters may be stored and maintained by EP 110 and/or server 140. In some embodiments, the one or more parameters for deriving a globally unique SPI value include an EP ID number, a key policy number, a shift factor, $K_{max}$, and $EP_{max}$. After receiving the request from EP 110, in some embodiments, server 140 locates and sends the parameter(s) above to EP 110. In some embodiments, the server 140 locates and sends the parameter(s) above to EP 110 automatically without receiving a request from EP 110.

At 830, EP 110 continues by receiving the one or more parameters (and the GSDF, if not already stored at the EP 110) from server 140. EP 110 then stores the parameter(s) and GSDF as SDD for use in deriving a globally unique outbound SPI value. In some embodiments, EP 110 may receive the parameter(s) described above without requesting them from server 140. In such embodiments, when EP 110 is added to network 100, server 140 may send the parameter(s) to EP 110 and continue to update EP 110 if any of the parameters change. At 840, EP 110 continues by deriving a globally unique SPI value by inputting the one or more parameters received from server 140 into the GSDF. Continuing with the example given in FIG. 3, if the EP ID number for EP 110 is EP2, the key policy number is K1, and there has been no EP restart (e.g. $S_j$ is zero), then using the GSDF, EP 110 will derive a 32-bit binary SPI value, which is denoted by cell 3 shown in FIG. 3. In some embodiments, EP 110 may store the derived SPI value.

As previously described, upon any CRUD events relating to a certain key policy, in some embodiments, server 140 may assign the key policy a new key policy number. In certain embodiments, the change to the key policy may be made by a network administrator through a user interface and be relayed to server 140. After receiving this update, in some embodiments, the server may store it, generate a new or changed key policy number, and send the new or changed key policy number to some or all EPs. EPs may then store the new or changed key policy number in their memory. Based on the changed key policy number, in some embodiments, EP 110 may re-derive its SPI value. An example of this was illustrated by FIG. 3.

As described above in relation to FIG. 4, an EP restart results in a shift factor change, which results in a change to the SPI values derived under multiple key policies for a certain EP. For instance, in some embodiments, server 140 responsible for managing EP2 may become aware of a restart by EP2. In such embodiments, server 140 may then store that update, change the existing shift factor corresponding to EP2, and send the new or changed shift factor to all EPs, even if they are under different key policies. Based on the new shift factor, in some embodiments, EP 110 may re-derive its SPI value. An example of this was illustrated by FIG. 4.

As described above in relation to FIG. 2, to establish secure IPSec tunnels between EP 110 and EP 120, in addition to globally unique SPI values, a unique session key for encryption/decryption may be used. In some embodiments, EP 110 may itself derive the session key for a given key policy by using the Session Key function previously described. In some other embodiments, server 140 may derive the session key. In such embodiments, EP 110 may send a request to server 140 for a session key. This request may include information regarding the destination EP (EP 120 in the example above) that EP 110 is attempting to communicate with. Upon receiving the request from EP 110, server 140 then derives the session key using a formula, such as the Session Key function described above. Subsequently, in some embodiments, server 140 may send the session key to EP 110, which may then proceed with establishing security associations with EP 120 using the session key and the outbound SPI value. It is important to note that step 840 of example operations 800, performed by EP 110, may correspond to step 720 of FIG. 7.

At 850, EP 110 continues by establishing security associations with EP 120 through network 100 for transmission of data. Using the globally unique outbound SPI value, EP 110 proceeds to establish security associations with EP 120 based on the security policies stored in the memory of EP 110. Security policies are security requirements or policy requisites for a security association to be established. Once outbound and inbound security associations have been established, in some embodiments, EP 110 may store them in a security association database in memory for later use by EP 110. Further, using the session key derived above, EP 110 may encrypt data packets for transmission to EP 120. On the other end, EP 120 may perform the same processes described above to derive the same SPI value, derived above by EP 110, as well as its own globally unique outbound SPI value. Using these SPI values, EP 120 may then derive the same session key to decrypt the encrypted data received from EP 110.

In some embodiments, server 140 may continue to automatically update EP 110 with any changes to one or more of the parameters, including a change to key policy numbers because of a CRUD event or any change in shift factors after an EP restart. In such embodiments, server 140 may send EP 110 new key policy numbers or new shift factors, which EP 110 may then store in its memory and also use to re-derive the globally unique SPI value. Establishing security associations between EP 110 and EP 120 results in a secured communication channel between the two EPs. This secured communication channel may then be used by EP 110 to transmit encrypted data packets to EP 120 and vice versa.

Moving now to FIG. 9, FIG. 9 illustrates example operations 900 for deriving a globally unique SPI value using server 140. With respect to the method outlined in FIG. 9, it is noted that certain details and features have been left out of example operations 900 in order not to obscure the discussion of the inventive features in the present invention.

As shown, at 910, server 140 receives a request from EP 110 for a globally unique SPI value to establish security associations with EP 120 in network 100, having a plurality of EPs. As described above in relation to FIG. 2, in some embodiments, the SPI values may be derived by server 140 instead of the EPs. In addition to a request for an outbound SPI value, in some embodiments, EP 110 may also request a session key from server 140. The request for the session key may be sent by EP 110 at the same time, prior to, or after the request for the outbound SPI value is sent.

At 920, server 140 continues with deriving the globally unique outbound SPI value for EP 110 using the same formula, GSDF, and the one or more parameters, described above in relation to FIG. 8. In some embodiments, after deriving the outbound SPI value, server 140 may also derive the session key using the Session Key function described in relation to FIG. 2.

At 930, server 140 continues by transmitting the derived globally unique outbound SPI to EP 110 for use in establishing security associations with EP 120. In addition to the outbound SPI value, in some embodiments, server 140 may also send the session key derived in step 920. After receiving the globally unique outbound SPI value and the session key, EP 110 establishes security associations with EP 120, as described by step 850 of FIG. 8.

At 940, server 140 continues with updating a shift factor of the one or more parameters after one or more of the plurality of EPs restarts. As described above, in some embodiments, one or more EPs may restart resulting in a change to their corresponding shift factors. In some embodiments, server 140 may then change the corresponding shift factor(s) and then store the new shift factor(s) in its memory. After changing the shift factor(s), in some embodiments, server 140 may re-derive the SPI value using the new shift factor(s) and send the updated SPI value to EP 110.

At 950, server 140 continues with updating a key policy number of the plurality of parameters upon a change to a key policy. In some embodiments, users may update, create, or delete key policies, which may lead server 140 to assign a new key policy number to an updated key policy, assign a new key policy to a new key policy, and/or disassociate a key policy number from a key policy if the key policy has been deleted, for example. Server 140 may then store these changes in its memory. After updating the key policy number, in some embodiments, server 140 may re-derive the SPI value using the new key policy number and send the updated SPI value to EP 110. It is important to note that steps 940 and 950 may take place in any order or, in some embodiments, may not take place at all.

Moving now to FIG. 10, FIG. 10 illustrates example operations 1000 for deriving a locally unique SPI value using an EP. With respect to the method outlined in FIG. 10, it is noted that certain details and features have been left out of example operations 1000 in order not to obscure the discussion of the inventive features in the present invention. Example operations 1000 will be described below by reference to EP 110, as an example. However, any other EP in distributed network 100 of FIG. 1 may also perform example operations 1000.

As shown, at 1010, EP 110 starts by receiving an EP ID number from server 140 after connecting to network 100. In some embodiments, this step may be performed as described in relation to step 810 of FIG. 8.

At 1020, EP 110 continues by optionally requesting an SPI derivation formula and one or more parameters from server 140. As described above, in relation to step 820 of FIG. 8, EP 110 may derive its own locally unique SPI value prior to any communication with EP 120. To derive a locally unique SPI value, EP 110 may use data (e.g. SDD) including one or more parameters and a formula. In some embodiments, the formula is the LSDF and the one or more parameters for deriving a locally unique SPI value include a source EP ID number ($EP_{src}$), a destination EP ID number ($EP_{dst}$), a key policy number, $EP_{max}$, $Row_{max}$, as well as k and e values. The LSDF and the one or more parameters may be stored and maintained by EP 110 and/or server 140.

At 1030, EP 110 continues by receiving the one or more parameters as well as the LSDF from server 140 (if LSDF is not already stored by EP 110). Step 1030 is performed as described in relation to step 830 of FIG. 8. In some embodiments, the server 140 locates and sends the parameter(s) above to EP 110 automatically without receiving a request from EP 110.

At 1040, EP 110 continues by deriving a locally unique SPI value by inputting one or more of the parameters received from server 140 into the LSDF. Examples of deriving locally unique SPI values were described in relation to FIG. 6.

At 1050, EP 110 continues by establishing security associations with EP 120 through network 100 for the transmission of data. Using the locally unique outbound SPI value and a session key, EP 110 proceeds to establish security associations with EP 120, in a similar manner described in relation to step 850 of FIG. 8. In some embodiments, server 140 may continue to automatically update EP 110 with any changes to one or more of the parameters, including a change in one or more k values, corresponding to one or more of the key policies (e.g. due to a CRUD event or a rekey), or any change in one or more e values corresponding to one or more of the EPs after an EP restart. In such embodiments, SPI values may be re-derived by EP 110, as also described in relation to step 850 of FIG. 8.

FIG. 11 illustrates example operations 1100 for deriving a locally unique SPI value using a server. With respect to the method outlined in FIG. 11, it is noted that certain details and features have been left out of example operations 1100 in order not to obscure the discussion of the inventive features in the present invention.

As shown, at 1110, server 140 receives a request from EP 110 for a locally unique SPI value to establish security associations with EP 120 in network 100, having a plurality of EPs. This was further described in relation to step 910 of FIG. 9.

At 1120, server 140 continues with deriving the locally unique outbound SPI value for EP 110 using the same formula, LSDF, and the one or more parameters, described above in FIG. 6. This step was further described in relation to step 920 of FIG. 9.

At 1130, server 140 continues by transmitting the derived locally unique outbound SPI to EP 110 for use in establishing security associations with EP 120. In addition to the outbound SPI value, in some embodiments, server 140 may also send the session key derived in step 1120. After receiving the locally unique outbound SPI value and the session key, EP 110 establishes security associations with EP 120, as described by step 1050 of FIG. 10.

At 1140, the server continues with updating an e value of the one or more parameters after a corresponding EP restarts. Each one of e values corresponding to each one of the plurality of EPs may be generated, maintained, and updated as described above, in relation to FIG. 5. After updating the e value corresponding to an EP, in some embodiments, server 140 may re-derive the SPI value.

At 1150, the server continues with updating a k value of the one or more parameters upon a change to a corresponding key policy. A key policy may change as described in relation to step 950 of FIG. 9. Accordingly, in some embodiments, the k value corresponding to a changed key policy may be updated based on a formula or algorithm. After this update, the row number (e.g. Row($K_t$, $EP_{dst}$)) may be re-calculated and, subsequently, the SPI value may be re-derived by SDN controller 260.

Figure 12:
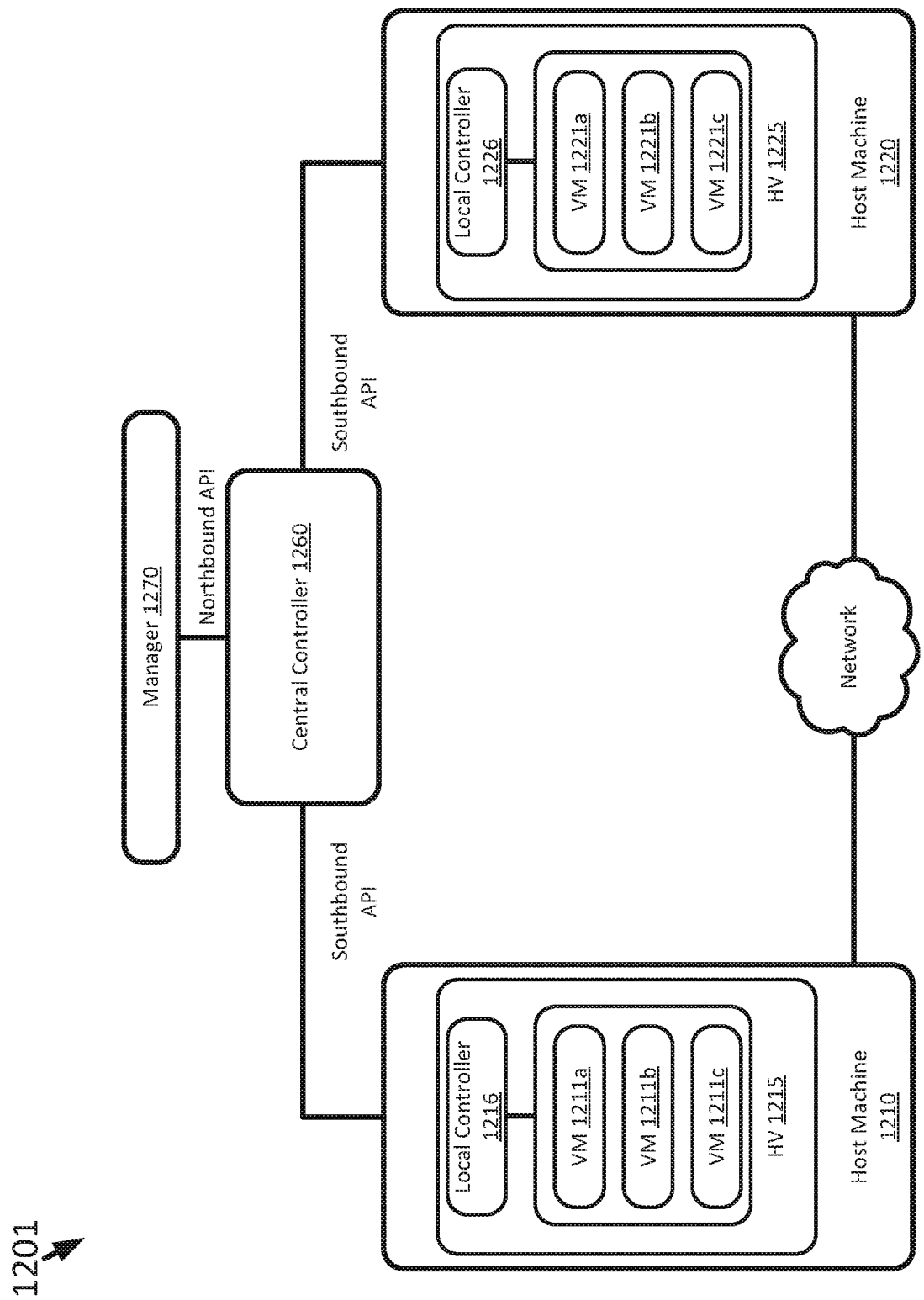
FIG. 12 is a block diagram of an example implementation of the network of FIG. 1.

FIG. 12 illustrates an example block diagram of network 1201, corresponding to network 100 of FIG. 1, in more detail. As described in relation to FIG. 1, in some embodiments EPs may be physical computing devices (e.g., physical servers, physical hosts). Network 1201 is an example of a network connecting host machines 1210 and 1220, each of which runs a hypervisor (HV) (e.g. HV 1215 and HV 1225, respectively) capable of executing a number of virtual machines (VMs) (VMs 1211*a*-1211*c* and 1221*a*-1221*c*, respectively). Accordingly, in network 1201, an EP may be a host machine hosting a hypervisor, which executes a number of VMs. It should be noted that though host machines 1210 and 1220 are described as supporting VMs, host machines 1210 and 1220 may similarly support any virtualized computing instance (e.g., virtual machine, container, data compute node, isolated user space instance).

Each of host machines 1210 and 1220 may be a computer (e.g., a desktop computer, personal computer, tablet computer, server computer, mainframe, a blade computer etc.), phone, PDA, or any other sort of electronic device. Each of host machines 1210 and 1220 may include various types of computer readable media and interfaces for various other types of computer readable media. In some embodiments, each of host machines 1210 and 1220 may include processing unit(s), a system memory, a read-only memory, a permanent storage device, and a network interface. In some embodiments, connecting these components together and allowing data transfer among them is a bus (not shown). For instance the bus may communicatively connect processing unit(s) to system memory and the other components.

In each of the host machines, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory. Each of host machines 1210 and 1220 may also include a network interface (e.g. network interface card (NIC)), which may be used to connect to a network between host machines 1210 and 1220. Host machines 1210 and 1220 may be connected through a network of computers such as a local area network ("LAN"), a wide area network ("WAN"), or a network of networks, such as the Internet. As shown in FIG. 12, each of host machines 1210 and 1220 also includes local controller 1216 and local controller 1226, running in HVs 1215 and 1225, respectively. Local controller 1216 and local controller 1226 manage interactions between their corresponding host machine and central controller 1260.

In some embodiments, each of host machines 1210 and 1220 may store in its memory a security association database, a security policy database and SDD, as described in relation to FIGS. 8 and 10.

In addition to host machines 1210 and 1220, network 1201 also includes central controller 1260 and manager 1270. In a Software-defined Networking ("SDN") environment, manager 1270 may be responsible for centralizing network management and receiving user input (e.g., through an application programming interface), in certain embodiments. Users (e.g., network administrators) may input data such as network configuration data, security rules, and key policies through, for example, a command-line interface, a graphical user interface, etc. Manager 1270 then relays the user input, received through the interface, to central controller 1260.

Moving now to central controller 260, in some embodiments, central controller 1260 may perform the functions of the server (e.g., server 140) described in FIGS. 1-11. In an SDN environment, central controller 260 may be in charge of managing the various components within network 1201 and maintaining information about VMs, hosts, etc. In some embodiments, central controller 260 manages these components using different sets of APIs. As shown in FIG. 12, central controller 1260 communicates with manager 1270 through a northbound API while using a southbound API to communicate with the various host machines. For instance, in some embodiments, central controller 1260 may receive user input or updates from manager 1270, determine the virtual machines that need to be updated, and then distribute the updates to the host machines supporting those VMs via the local controllers. In some embodiments, central controller 1260 may store security rules and key policies in memory allocated to central controller 1260.

Though shown as single entities, it should be understood that both central controller 1260 and manager 1270 may be implemented as a distributed or clustered system(s). That is, manager 1270 may include multiple computing devices or virtual machines that implement management plane functions. In addition, central controller 1260 may be a network controller cluster including multiple network controller nodes (e.g. central controller computers or virtual machines or containers or other logical compute instances that implement central control plane functions. In some embodiments, each centralized controller may include both management plane and central control plane functions (e.g., as separate applications or functions).

In some embodiments, each network controller node communicates with other controller nodes via intra-cluster communications. For example, in some embodiments, a key policy may be defined specifically for (e.g. or owned by) a certain network controller node and the host machines connected to that network controller node. However, all CRUD (create, read, update, and delete) operations relating to the key policy may be propagated to other network controller nodes in the cluster via intra-cluster communications. As another example, in some embodiments, each host machine may be connected to a single network controller node from the network controller cluster. However, while only the network controller node connected to the host knows of events relating to the current state of the host machine (e.g. host restart etc.), other network controllers in the network controller cluster may be updated with such events via intra-cluster communications.

The embodiments described herein may provide several advantages over other systems and methods for the derivation and allocation of SPI values. By utilizing the systems and methods discussed herein, SPI values can be derived on-demand by either EPs or servers without having to store the SPI values, which leads to a great performance gain, prevents major bottlenecks, and requires much less storage space.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for allocating security parameter index ("SPI") values to a plurality of endpoints comprising computing devices in a computer network including a first endpoint and a second endpoint, the method comprising:
    deriving, independently at the first endpoint, an SPI value using a global SPI derivation formula, "GSDF," that takes as input parameters including:
        (1) a source endpoint ID number corresponding to the first endpoint,
        (2) a key policy number corresponding to a key policy assigned to the first endpoint for generating an encryption key for establishing a secured communication channel,
        (3) a shift factor that changes in response to each restart of the first endpoint,
        (4) a maximum endpoint ID number corresponding to a maximum number of endpoints that the computer network supports, and
        (5) a maximum key policy number corresponding to a maximum number of key policies that the computer network supports,
        wherein the deriving is performed independently such that SPI values allocated to the plurality of endpoints do not have to be calculated and distributed to the plurality of endpoints by a central unit;
    establishing the secured communication channel between the first endpoint and the second endpoint using the SPI value; and
    communicating, by the first endpoint, with the second endpoint over the secured communication channel.

2. The method of claim 1, wherein the SPI derivation formula is:

$$SPI(K_i, EP_i, S_j) = EP_{max} * [(K_i - S_j + K_{max}) \% K_{max}] + EP_j + 1;$$
and wherein SPI represents a binary value corresponding to the SPI value, $K_i$, corresponds to the key policy number, $EP_{max}$ corresponds to the maximum endpoint ID number, $EP_{max}$ is a constant, $K_{max}$ corresponds to the maximum key policy number, $EP_j$ corresponds to the source endpoint ID number, and $S_j$ corresponds to the shift factor.

3. The method of claim 1, wherein establishing the secured communication channel comprises establishing an outbound security association using the SPI value for securing outgoing traffic at the first endpoint, and wherein the SPI value is different from any of the SPI values used for any other outbound security association established for securing outgoing traffic at any other one of the plurality of endpoints in the computer network.

4. The method of claim 1, wherein the second endpoint is configured to independently derive a second SPI value using the SPI derivation formula and a second set of one or more parameters, and wherein the establishing the secured communication channel between the first endpoint and the second endpoint comprises establishing a first security association for communication from the first endpoint to the second endpoint using the SPI value and establishing a second security association for communication from the second endpoint to the first endpoint using the second SPI value.

5. The method of claim 1, wherein the communicating, by the first endpoint, comprises encrypting data using the SPI value and transmitting the encrypted data to the second endpoint over the secured communication channel, wherein the second endpoint is configured to independently derive the SPI value using the SPI derivation formula and the one or more parameters, and wherein the second endpoint is configured to receive and decrypt the encrypted data based on the SPI value.

6. A computer system comprising one or more processors configured to execute a method for allocating security parameter index ("SPI") values to a plurality of endpoints comprising computing devices in a computer network including a first endpoint and a second endpoint, the method comprising:
    deriving, independently at the first endpoint, an SPI value using a global SPI derivation formula, "GSDF," that takes as input parameters including:
        (1) a source endpoint ID number corresponding to the first endpoint
        (2) a key policy number corresponding to a key policy assigned to the first endpoint for generating an encryption key for establishing a secured communication channel,
        (3) a shift factor that changes in response to each restart of the first endpoint,
        (4) a maximum endpoint ID number corresponding to a maximum number of endpoints that the computer network supports, and
        (5) a maximum key policy number corresponding to a maximum number of key policies that the computer network supports,
        wherein the deriving is performed independently such that SPI values allocated to the plurality of endpoints do not have to be calculated and distributed to the plurality of endpoints by a central unit;
    establishing the secured communication channel between the first endpoint and the second endpoint using the SPI value; and
    communicating, by the first endpoint, with the second endpoint over the secured communication channel.

7. The computer system of claim 6, wherein the SPI derivation formula is:

$$SPI(K_i, EP, S_j) = EP_{max} * [(K_i - S_j + K_{max})\% \ K_{max}] + EP_j + 1;$$
and wherein SPI represents a binary value corresponding to the SPI value, $K_i$ corresponds to the key policy number, $EP_{max}$ corresponds to the maximum endpoint ID number, $K_{max}$ corresponds to the maximum key policy number, $EP_{max}$ is a constant, $EP_j$ corresponds to the source endpoint ID number, and $S_j$ corresponds to the shift factor.

8. The computer system of claim 6, wherein establishing the secured communication channel comprises establishing an outbound security association using the SPI value for securing outgoing traffic at the first endpoint, and wherein the SPI value is different from any of the SPI values used for any other outbound security association established for securing outgoing traffic at any other one of the plurality of endpoints in the computer network.

9. The computer system of claim 6, wherein the second endpoint is configured to independently derive a second SPI value using the SPI derivation formula and a second set of one or more parameters, and wherein the establishing the secured communication channel between the first endpoint and the second endpoint comprises establishing a first security association for communication from the first endpoint to the second endpoint using the SPI value and establishing a second security association for communication from the second endpoint to the first endpoint using the second SPI value.

10. The computer system of claim 6, wherein the communicating, by the first endpoint, comprises encrypting data using the SPI value and transmitting the encrypted data to the second endpoint over the secured communication channel, wherein the second endpoint is configured to independently derive the SPI value using the SPI derivation formula and the one or more parameters, and wherein the second endpoint is configured to receive and decrypt the encrypted data based on the SPI value.

11. A non-transitory computer readable medium comprising instructions to be executed in a computer system, wherein the instructions when executed in the computer system cause the computer system to perform a method for allocating security parameter index ("SPI") values to a plurality of endpoints comprising computing devices in a computer network including a first endpoint and a second endpoint, the method comprising:
   deriving, independently at the first endpoint, an SPI value using a global SPI derivation formula, "GSDF," that takes as input parameters including:
   (1) a source endpoint ID number corresponding to the first endpoint,
   (2) a key policy number corresponding to a key policy assigned to the first endpoint for generating an encryption key for establishing a secured communication channel,
   (3) a shift factor that changes in response to each restart of the first endpoint,
   (4) a maximum endpoint ID number corresponding to a maximum number of endpoints that the computer network supports, and
   (5) a maximum key policy number corresponding to a maximum number of key policies that the computer network supports,
   wherein the deriving is performed independently such that SPI values allocated to the plurality of endpoints do not have to be calculated and distributed to the plurality of endpoints by a central unit;
   establishing the secured communication channel between the first endpoint and the second endpoint using the SPI value; and
   communicating, by the first endpoint, with the second endpoint over the secured communication channel.

12. The computer readable medium of claim 11, wherein the SPI derivation formula is:

$$SPI(K_i, EP, S_j) = EP_{max} * [(K_i - S_j + K_{max})\% \ K_{max}] + EP_j + 1;$$
and wherein SPI represents a binary value corresponding to the SPI value, $K_i$ corresponds to the key policy number, $EP_{max}$ corresponds to the maximum endpoint ID number, $K_{max}$ corresponds to the maximum key policy number, $EP_{max}$ is a constant, $EP_j$ corresponds to the source endpoint ID number, and $S_j$ corresponds to the shift factor.

13. The computer readable medium of claim 11, wherein establishing the secured communication channel comprises establishing an outbound security association using the SPI value for securing outgoing traffic at the first endpoint, and wherein the SPI value is different from any of the SPI values used for any other outbound security association established for securing outgoing traffic at any other one of the plurality of endpoints in the computer network.

14. The computer readable medium of claim 11, wherein the second endpoint is configured to independently derive a second SPI value using the SPI derivation formula and a second set of one or more parameters, and wherein the establishing the secured communication channel between the first endpoint and the second endpoint comprises establishing a first security association for communication from the first endpoint to the second endpoint using the SPI value and establishing a second security association for communication from the second endpoint to the first endpoint using the second SPI value.

15. The computer readable medium of claim 11, wherein the communicating, by the first endpoint, comprises encrypting data using the SPI value and transmitting the encrypted data to the second endpoint over the secured communication channel, wherein the second endpoint is configured to independently derive the SPI value using the SPI derivation formula and the one or more parameters, and wherein the second endpoint is configured to receive and decrypt the encrypted data based on the SPI value.

16. A computer system comprising:
   means for deriving, independently at a first endpoint, a security a parameter index ("SPI") value using a global SPI derivation formula, "GSDF," that takes as input parameters including:
   (1) a source endpoint ID number corresponding to the first endpoint
   (2) a key policy number corresponding to a key policy assigned to the first endpoint for generating an encryption key for establishing a secured communication channel,
   (3) a shift factor that changes in response to each restart of the first endpoint,
   (4) a maximum endpoint ID number corresponding to a maximum number of endpoints that a computer network supports, and
   (5) a maximum key policy number corresponding to a maximum number of key policies that the computer network supports, wherein the deriving is performed independently such that SPI values allocated to a plurality of endpoints do not have to be calculated and distributed to the plurality of endpoints by a central unit;

means for establishing the secured communication channel between the first endpoint and a second endpoint using the SPI value; and means for communicating, by the first endpoint, with the second endpoint over the secured communication channel.

17. The method of claim 1, wherein the GSDF causes each endpoint to independently derive a respective set of globally unique SPI values.

18. The computer system of claim 6, wherein the GSDF causes each endpoint to independently derive a respective set of globally unique SPI values.

19. The computer readable medium of claim 11, wherein the GSDF causes each endpoint to independently derive a respective set of globally unique SPI values.

* * * * *